(12) United States Patent
Takagi et al.

(10) Patent No.: US 6,351,708 B1
(45) Date of Patent: Feb. 26, 2002

(54) VEHICLE NAVIGATION SYSTEM AND METHOD

(75) Inventors: Toru Takagi; Naoki Honda, both of Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/482,094

(22) Filed: Jan. 13, 2000

(30) Foreign Application Priority Data

Jan. 14, 1999 (JP) .......................................... 11-008334

(51) Int. Cl.$^7$ ............................ G01C 21/00; G01S 5/00; G01S 13/00; G06F 7/00; G06F 17/00; G06F 19/00; G06F 165/00

(52) U.S. Cl. ............................... 701/209; 701/200–208; 701/210–215; 701/23–26; 340/928; 340/988; 340/990; 340/995; 705/415; 705/418; 342/42; 342/357.12; 342/357.13; 342/457

(58) Field of Search ................................ 701/200–215, 701/23–26; 340/990, 928, 988, 995; 705/415, 418; 342/42, 357.12, 457, 357.13

(56) References Cited

U.S. PATENT DOCUMENTS

| | | | | |
|---|---|---|---|---|
| 5,223,844 A | * | 6/1993 | Mansell et al. ............. | 342/357 |
| 5,802,492 A | * | 9/1998 | Delorme et al. ............ | 701/200 |
| 5,850,618 A | * | 12/1998 | Suetsugu et al. ........... | 701/210 |
| 5,948,040 A | * | 9/1999 | Delorme et al. ............ | 701/201 |
| 6,038,508 A | * | 4/2000 | Maekawa et al. ........... | 701/207 |
| 6,169,902 B1 | * | 1/2001 | Kawamoto .................. | 455/456 |
| 6,185,503 B1 | * | 2/2001 | Sumizawa ................... | 701/209 |

FOREIGN PATENT DOCUMENTS

JP    11-153443    6/1999

\* cited by examiner

*Primary Examiner*—William A. Cuchlinski, Jr.
*Assistant Examiner*—Ronnie Mancho
(74) *Attorney, Agent, or Firm*—McDermott, Will & Emery

(57) ABSTRACT

A vehicle navigation system and method in the present invention comprises a navigation apparatus transmitting a current position of a vehicle and a target destination of the vehicle, and a base station receiving the current position and the target destination, searching a route information from the current position to the target destination, and transmitting the route information to the navigation apparatus. The base station includes an information storage section storing added information with regard to road features, a route searching section searching the added route information from the information storage section, a transmitting section transmitting the route information to the navigation apparatus and then transmitting the added information to the navigation apparatus. The navigation apparatus displays the route information and the added route information each of which is transmitted from the base station.

18 Claims, 10 Drawing Sheets

VEHICLE NAVIGATION SYSTEM AND METHOD

BACKGROUND OF THE INVENTION

The present invention relates to a vehicle navigation system and method, which use mobile communication between a vehicle into which a navigation apparatus is installed and a base station so as to communicate route information for guiding the vehicle, thereby guiding the vehicle.

In a vehicle navigation system in the past, the current position of the vehicle and its target destination are communicated to a base station using a mobile communication apparatus, a recommended route to its target destination is searched at the base station based on the acquired current position, and this recommended route data is transmitted to the vehicle.

SUMMARY OF THE INVENTION

According to an investigation made by the present inventors, in a vehicle navigation system of the past, because only a recommended route is transmitted to the vehicle, there can occur discrepancies between the display screen and the actual road, so that it is possible to veer from the recommended route and follow the deviated road.

As a countermeasure with respect to the above-noted problem, a system can be envisioned in which, in addition to the recommended route from the base station, road map data is also transmitted from the base station.

In the above-noted case, however, because of the limitations in circuit capacity normally imposed on mobile communication, the time required for transmission becomes long, and also there can be interruptions of the circuit during the transmission. In the case in which the circuit is interrupted during communication, it is necessary to restart the series of data to be transmitted from the beginning, this representing a drop in communication efficiency.

Accordingly, the present invention was made in consideration of the above-noted drawbacks, and has as an object to provide a vehicle navigation system and method which seek to improve the faithfulness of the display screen with respect to the actual road, and which also provide an improvement in communication efficiency.

A vehicle navigation system according to the present invention comprises a navigation apparatus transmitting a current position of a vehicle and a target destination of the vehicle, and a base station receiving the current position and the target destination, searching a route information from the current position to the target destination, and transmitting the route information to the navigation apparatus. The base station includes an information storage section storing map information and added information with regard to road features, a route searching section searching the added route information from the information storage section, a transmitting section transmitting the route information to the navigation apparatus and then transmitting the added information to the navigation apparatus. The navigation apparatus displays the route information and the added route information each of which is transmitted from the base station.

According to the above-noted configuration, the map information and also added information which represents, for example, visible features of the road are pre-stored at the base station, and a search is made as to the added information which relates to the selected route. The route information is transmitted to the navigation apparatus, and then the added information is transmitted to the navigation apparatus. At the navigation apparatus, the route information and also added information received from the base station are displayed.

Therefore, the operator such as a passenger can view not only the route information, but also the added information that represents visible road features regarding the selected route, thereby improving the faithfulness of the display to the actual road being traveled. As a result, it is possible to effectively prevent the operator from veering from the selected route and traveling along the different road.

Stated in different terms, a vehicle navigation system according to the present invention comprises a navigation apparatus transmitting a current position of a vehicle and a target destination of the vehicle, and a base station receiving the current position and the target destination, searching a route information from the current position to the target destination, and transmitting the route information to the navigation apparatus. The base station includes means for storing added information with regard to road features, means for searching the added route information from the storage means and means for transmitting the route information to the navigation apparatus and for then transmitting the added route information to the navigation apparatus. The navigation apparatus displaying the route information and the added route information each of which is transmitted from the base station.

On the other hand, in a vehicle navigation method according to the present invention, a navigation apparatus transmits a current position of a vehicle and a target destination of the vehicle to a base station, and the base station receives the current position and the target destination. At the base station, route information with regard to a route from the current position to the target destination is searched, and the route information is transmitted to the navigation apparatus. Besides, the added route information with regard to the route is searched, and after the route information is transmitted to the navigation apparatus, the added route information is transmitted to the navigation apparatus. The navigation apparatus displays the route information and added route information each of which is transmitted from the base station.

DETAILED DESCRIPTION OF THE PREFERRED EMBODIMENTS

Preferred embodiments of the invention are described in detail below, with reference to relevant accompanying drawings.

Figure 1:
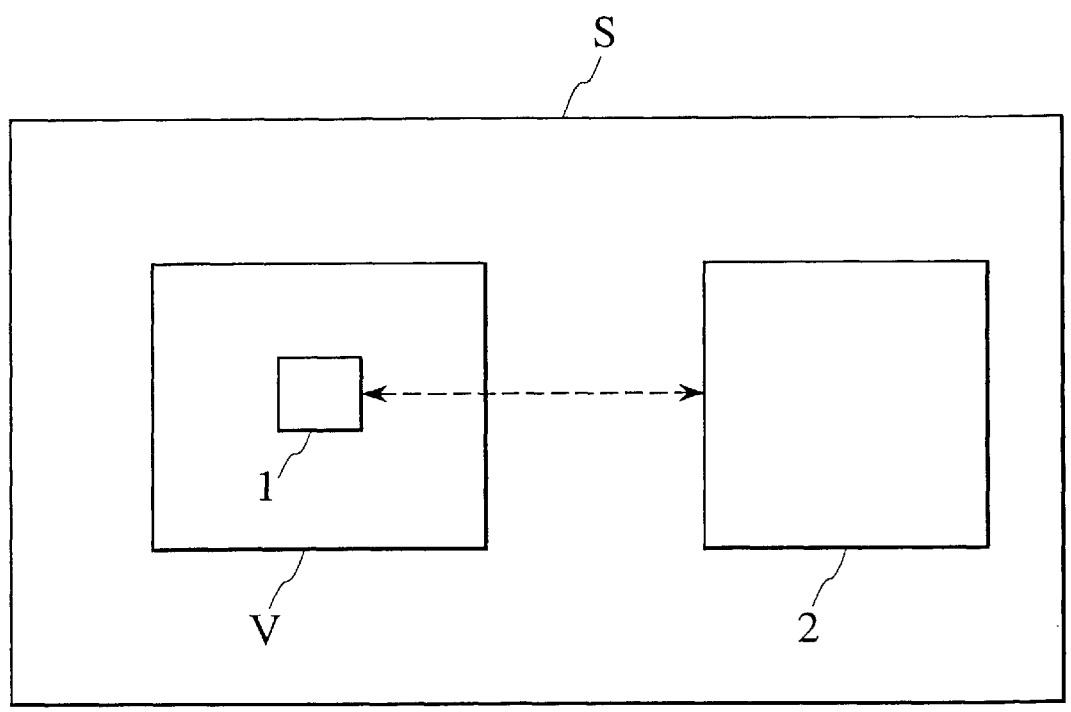
FIG. 1 is a block diagram of a vehicle navigation system of the first embodiment according to the present invention.

The first embodiment of a vehicle navigation system S according to the present invention is shown in FIG. 1 and is described below. The vehicle navigation system S of this embodiment includes a navigation apparatus 1 installed within a vehicle V that moves independently along a road, and a base station 2 that is located at a distance from the vehicle V.

Figure 2:
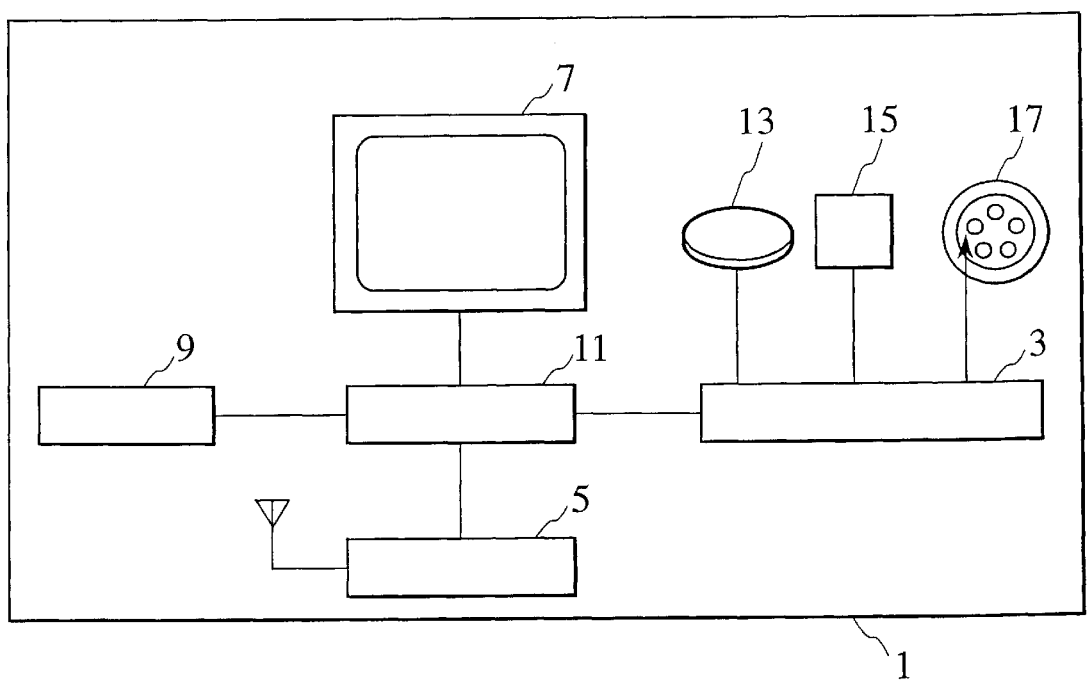
FIG. 2 is a block diagram of the navigation apparatus of the vehicle navigation system of the first embodiment.

As shown in FIG. 2, the navigation apparatus 1 of this embodiment transmits a signal which identifies itself when transmitting an information signal, and has a current position measuring section 3, a vehicle-mounted communication section 5, a display 7, an input section 9, a controller 11, a GPS antenna 13, a gyro sensor 15, and a distance sensor 17.

The current position measuring section 3 receives a radio signal transmitted from a position-measuring satellite, via the GPS antenna 13, and measures the current position P of the vehicle as absolute position information.

In the case in which the current position measuring section 3 can not receive the radio signal from the satellite via the GPS antenna 13, the current position measuring section 3 employs a known accumulative calculation method to predict the current vehicle position P, based on position information from the gyro sensor 15 mounted to the vehicle and the distance sensor 17 mounting to a wheel, using self-contained navigation.

The vehicle-mounted communication section 5 communicates by radio an information signal between the base station 2, specifically described below, and the navigation apparatus 1. When transmitting the information signal, the vehicle-mounted communication section 5 transmits an identification signal that identifies itself.

The display 7 provides an overlapped display of the route information IR received via the vehicle-mounted communication section 5, added route information IRA also received via the vehicle-mounted communication section 5, the current position P measured by the current position measuring section 3, and the target destination T input from the input section 9.

The route information IR is made up of intersection nodes and road links.

The added route information IRA is made up of side roads, landmarks (such as prominent buildings and parks), and names of intersections. A side road is a road link outside the route and which is connected to an intersection node of the route information, but which has another end that is not connected to an intersection node.

The input section 9, in response to operation from an operator, for example, a passenger, inputs such information as target destination T, search conditions C, and added route information conditions CA.

The controller 11 has such elements as a CPU, ROM, and RAM that are required for performing control and, in accordance with a control program that is pre-stored in the ROM, performs the control of the current position measuring section 3, the vehicle-mounted communication section 5, the display 7, the input section 9 and the like. This control program can alternately, of course, be a program stored in the RAM.

Next, referring to FIG. 3, the configuration of the base station 2 of this embodiment, which provides information over a prescribed surface area, is described below. The base station 2 has a base station communication section 19, a road map data storage section 21, a route searching section 23, a route information storage section 25, an added route information storage section 27 and a controller 29.

The base station communication section 19 performs communication of information signals with the navigation apparatus 1.

The road map data storage section 21 has road map data pre-stored in it.

The route searching section 23, based on such information as the current position P, the target destination T, the route searching conditions C, and the added route information conditions CA sent by the radio signals from the navigation apparatus 1, searches the road map data stored in the road map data storage section 21 and outputs to the controller 29 route information IR and added route information IRA for a route from the current position P to the target destination T.

The route information storage section 25 stores the route information IR that was searched and extracted by the route searching section 23.

The added route information storage section 27 stores the added route information IRA that was searched and extracted by the route searching section 23.

The controller 29 has such elements as a CPU, ROM, and RAM that are required for performing control and, in accordance with a control program that is pre-stored in the ROM, performs the control of the base station communication section 19, road map data storage section 21, route searching section 23, route information storage section 25, and added route information storage section 27. This control program can alternately, of course, be a program stored in the RAM.

Figure 3:
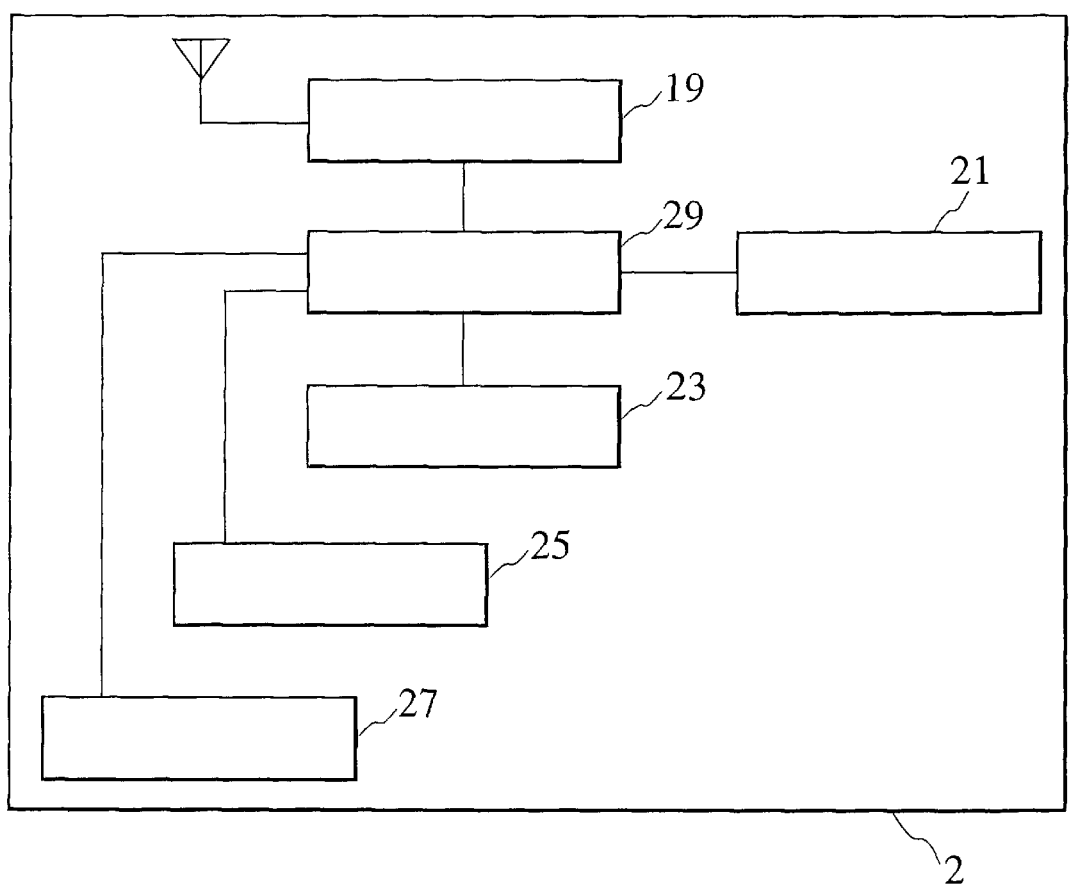
FIG. 3 is a block diagram of the base station of the vehicle navigation system of the first embodiment.
Figure 4A:
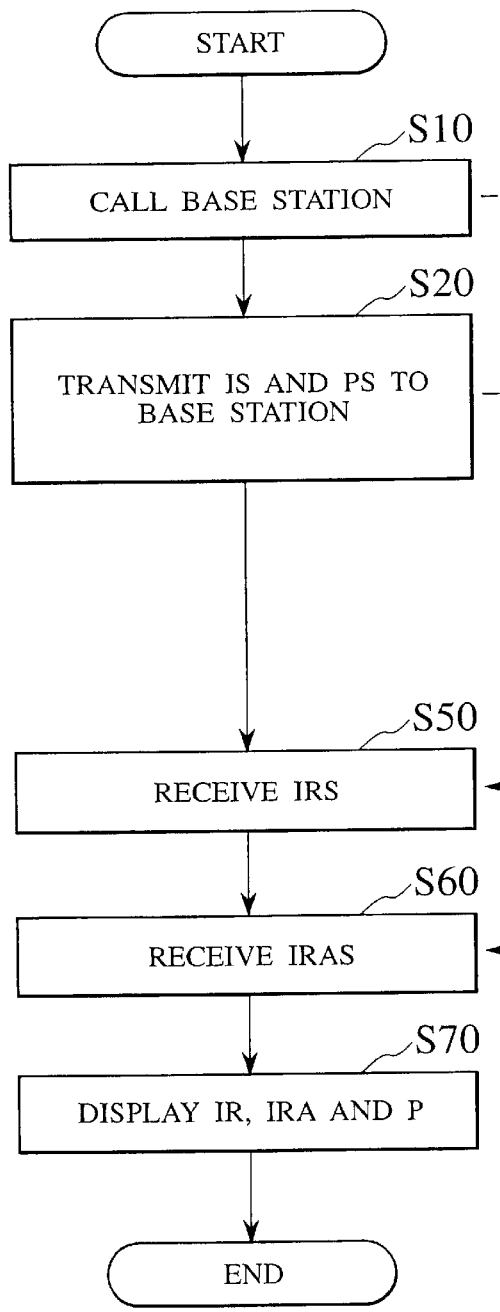
FIG. 4A is a flowchart of the navigation apparatus of the vehicle navigation system of the first embodiment.
Figure 4B:
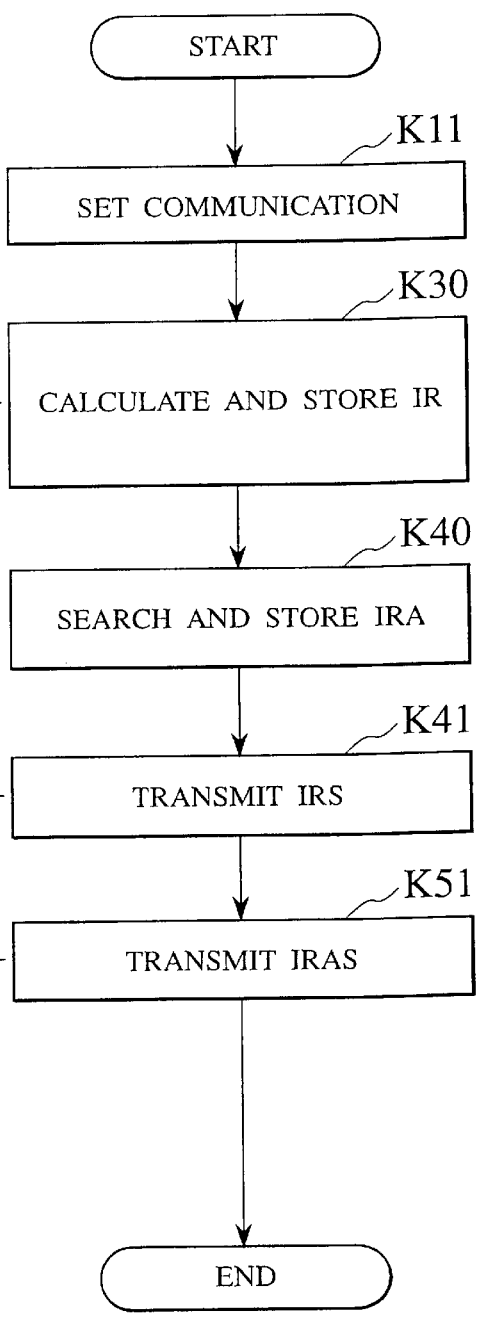
FIG. 4B is a flowchart of the base station of the vehicle navigation system of the first embodiment.

Referring to FIG. 1 to FIG. 3, and also making reference to the flowcharts of FIG. 4A and FIG. 4B, the operation of this embodiment of the vehicle navigation system is described below. The flowchart of FIG. 4A illustrates the operation of the navigation apparatus 1, while the flowchart of FIG. 4B illustrates the operation of the base station 2.

First, at step S10, the navigation apparatus 1 calls the base station communication section 19 of the base station 2, via the vehicle-mounted communication section 5.

In response to this call, at step K11, the base station 2 receives the call from the navigation apparatus 1 via the base station communication section 19, establishes a communication circuit, and sets communication.

Next, at step S20, an operator, for example, a passenger inputs the target destination T. the route searching conditions C, and the added route information conditions CA, via the input section 9 of the navigation apparatus 1. An information signal IS that includes this information is sent to the base station 2 via the vehicle-mounted communication section 5. Simultaneously with this, a position signal PS of the current position P that is measured by the current position measuring section 3 is sent to the base station 2.

In response to the above, at step K30, based on the information signal IS and position signal PS received via the base station communication section 19 of the base station 2, the target destination T, the route searching conditions C, the added route information conditions CA, and the current position P are sent to the route searching section 23.

At this point, the route searching section 23, based on the vehicle current position P, the target destination T, the route searching conditions C, and the added route information conditions CA, calculates the route information IR for a path from the current position P to the target destination T, and stores the result of the calculation in the route information storage section 25.

Next, at step K40, the controller 29 searches the road map data storage section 21 for the added route information corresponding to the route information IR that was calculated by the route searching section 23, and stores the results of that search operation into the added route information storage section 27 as the added route information IRA.

Next, at step K41, the controller 29 reads the route information IR from the route information storage section 25 and transmits this route information IR to the base station communication section 19. And its route information signal IRS is transmitted from the base station communication section 19 to the navigation apparatus 1 from which there was a call.

In response to the above, at step S50, the navigation apparatus 1 receives the route information signal IRS from the base station 2 via the vehicle-mounted communication section 5.

Next, at step K51, the controller 29 of the base station 2 reads the added route information IRA from the added route information storage section 27, and transmits this added route information to the base station communication section 19. And its added route information signal IRAS is transmitted from the base station communication section 19 to the navigation apparatus 1 from which there was a call.

In response to the above, at step S60, the navigation apparatus 1 receives the added route information signal IRAS from the base station 2 via the vehicle-mounted communication section 5.

Next, at step S70, the controller 11 of the navigation apparatus 1 stores the received route information IR and added route information IRA into the RAM. And while the current position P that is measured by the current position measuring section 3 is also superimposed, the route information IR and added route information IRA are displayed on the display 7.

Thereafter, the operator of the vehicle, for example, the passenger can use the route displayed on the display 7 and such features as intersections, buildings, or side roads that are displayed on the display 7, this being not only the route information IR but also the added route information IRA, as a guide in verifying the actual road conditions, so as to drive or guide the vehicle along the displayed path, thereby enabling the reliable attainment of the desired target destination.

As described above, according to this embodiment of the present invention, because it is possible for the operator such as a passenger to grasp the relationship between the display and the road actually being traveled along, it is possible to effectively prevent inadvertent veering from the intended route.

Additionally, because the added route information is transmitted after transmitting the route information, even if communication is interrupted during transmission of the added route information, it is not necessary to resend the route information. That is, it is sufficient to resend only the added route information.

Therefore, the amount of information that is resent is reduced, enabling efficient communication on the allocated frequency, this representing an improvement in the communication efficiency.

Although this embodiment of the present invention is described for the case in which the added route information is made up of side roads, landmarks such as buildings, and intersections, it will be understood that it is possible to pick and choose these as necessary, or to add other elements, so as to typically provide the passenger with information that is visually characteristic of the road. That is, the visible road features can be preferably used as the added route information.

The second embodiment of a vehicle navigation system according to the present invention is described below, with reference being made to relevant accompanying drawings.

Because the navigation apparatus of the second embodiment of the vehicle navigation system according to the present invention has the same type of configuration as shown in FIG. 2 with regard to the first embodiment, the description thereof will be omitted, and the base station used in this second embodiment of the vehicle navigation system will be described with reference to FIG. 4.

Steps which operate in the same manner as steps of the first embodiment will be also briefly described.

Figure 5:
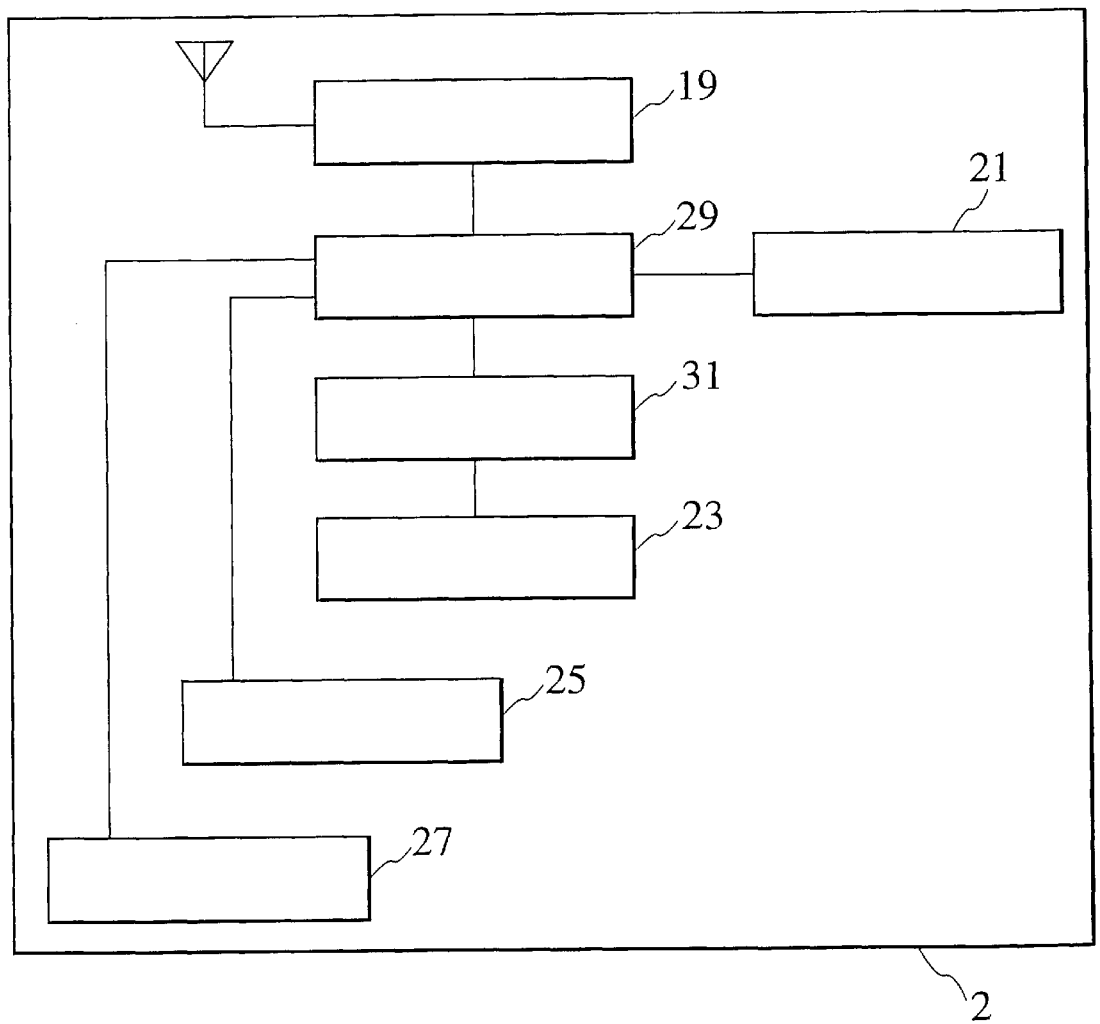
FIG. 5 is a block diagram of the base station of a vehicle navigation system of the second embodiment according to the present invention.

First, referring to FIG. 5, concerning the configuration of the base station 2, its parts which differ from the first embodiment are mainly described below.

The route searching section 23 transmits the route information IR and the added route information IRA, which are obtained in a manner similar to that described with regard to the first embodiment, to a route division calculation section 31.

The route division calculation section 31 divides the route information IR and the added route information IRA each into M blocks, thereby creating route information IRm and added route information IRAm which each correspond to the M blocks, where m=1, 2, 3 ... M, M being an integer greater than 1.

The route information storage section 25 sequentially stores each block IRm of the route information IR obtained by the division performed by the route division calculation section 31. In the same manner, the added route information storage section 27 sequentially stores each block IRAm of the added route information IRA obtained by the division performed by the route division calculation section 31.

The controller 29 controls such system elements as the base station communication section 19, the road map data storage section 21, the route searching section 23, the route division calculation section 31, the route information storage section 25, and the added route information storage section 27.

Figure 6A:
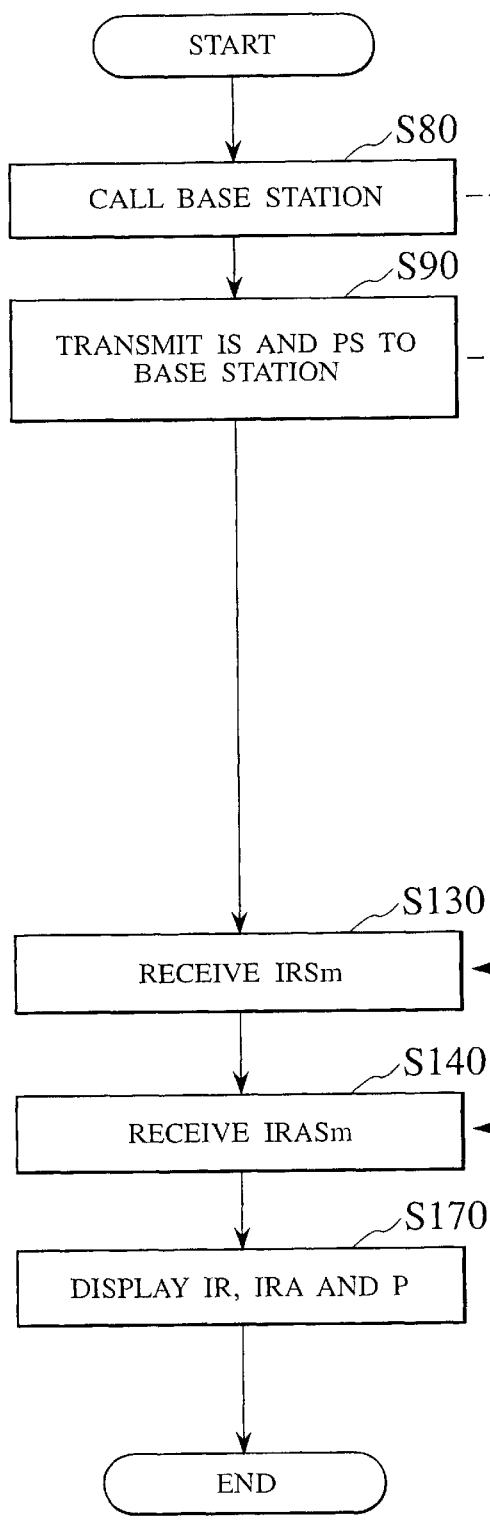
FIG. 6A is a flowchart of the navigation apparatus of the vehicle navigation system of the second embodiment.
Figure 6B:
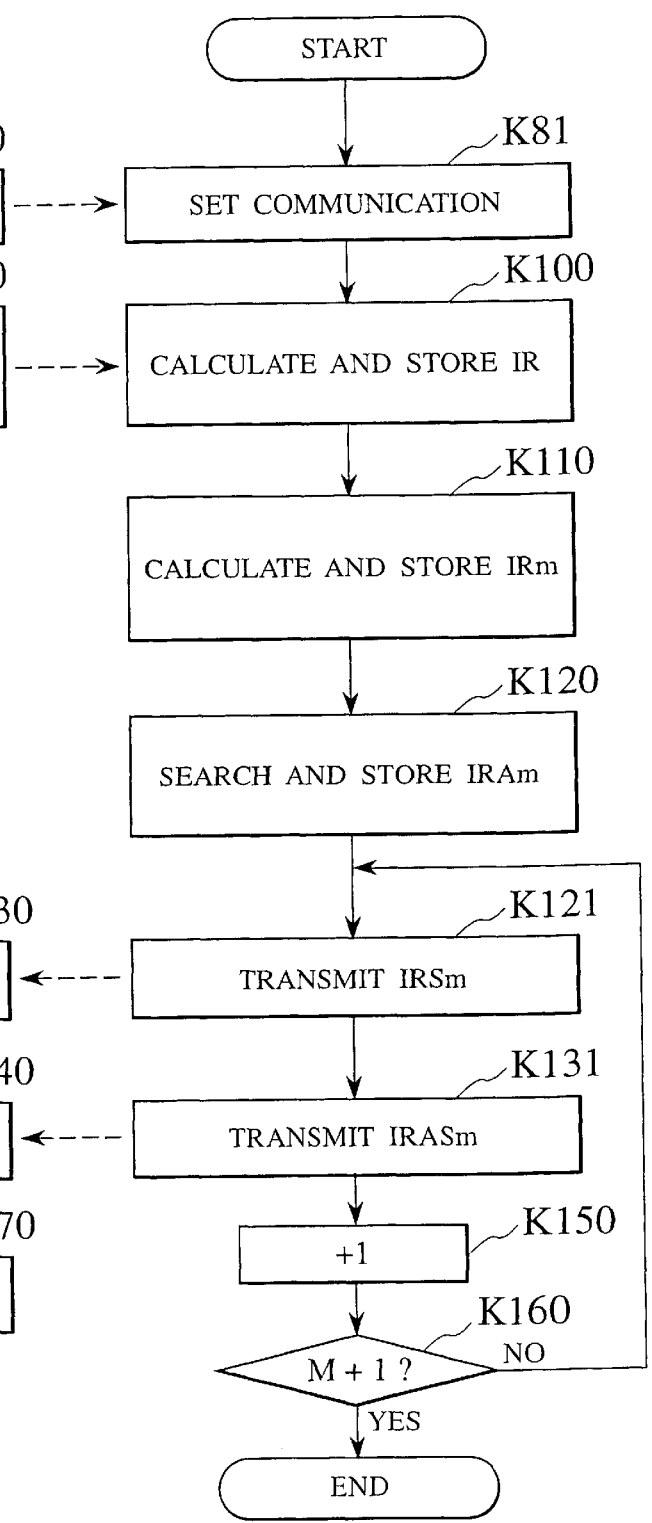
FIG. 6B is a flowchart of the base station of the vehicle navigation system of the second embodiment.

The operation of this embodiment is described below, with reference being made to the flowcharts of FIG. 6A and FIG. 6B. FIG. 6A shows the operation of the navigation apparatus 1 of this embodiment, and the flowchart of FIG. 6B shows the operation of the base station 2 of this embodiment.

First, at step S80, the navigation apparatus 1 calls the base station communication section 19 of the base station 2 via the vehicle-mounted communication section 5.

In response to this call, at step K81, the base station 2 receives the call from the navigation apparatus 1 via the base station communication section 19, establishes a communication circuit, and sets communication.

Next, at step S90 an operator, for example, a passenger inputs the target destination T, the route searching conditions C, and the added route information conditions CA, via the input section 9 of the navigation apparatus 1, and an information signal IS that includes this information is transmitted to the base station 2 via the vehicle-mounted communication section 5. Simultaneously with this, a position signal PS of the current position P that is measured by the current position measuring section 3 is transmitted to the base station 2.

In response to the above, at step K100 based on the information signal IS and position signal PS received via the base station communication section 19 of the base station 2, the target destination T, the route searching conditions C, the added route information conditions CA, and the current position P are sent to the route searching section 23.

At this point, the route searching section 23, based on the vehicle current position P, the target destination T, the route searching conditions C, and the added route information conditions CA, calculates the route information IR for a path from the current position P to the target destination T, and stores the result of the calculation in the route information storage section 25.

Next, at step K110, the route division calculation section 31 divides the route information IR obtained at step K100 into M parts. And each block IRm corresponding to the M-divided route information IR is stored in the route information storage section 25, in the sequence m=1, 2, 3 . . . M, starting from the current position.

Next, at step K120, the controller 29 searches each added route information IRAm corresponding to each block IRm of the route information IR stored in the route information storage section 25 from the road map data storage section 21, and the results of that search are stored in the added route information storage section 27 as blocks IRAm of the added route information corresponding to the individual blocks IRm of route information IR.

Next, at step K121, the controller 29 reads the first block IR1 of route information IR from the route information storage section 25 and send this block of route information to the base station communication section 19, and its route information signal IRS1 is transmitted to the navigation apparatus 1 from which there was a call.

In response to the above, at step S130, the navigation apparatus 1 receives the route information signal IRS1 from the base station 2 via the vehicle-mounted communication section 5.

Next, at step K131, the controller 29 of the base station 2 reads the first block IRAL of the added route information IRA from the added route information storage section 27, and transmits this added route information to the base station communication section 19, and its added route information signal IRAS1 is transmitted from the base station communication section 19 to the navigation apparatus 1 from which there was a call.

In response to the above, at step S140, the controller 11 of the navigation apparatus 1 receives the added route information signal IRAS1 from the base station 2 via the vehicle-mounted communication section 5.

Next, at step K150, the controller 29 of the base station 2 increments the block number by 1 to generate a new block number.

Next, at step K160, if the new block number is less than M+1, return is made to step K121.

If return is made to step K121 as noted above, the processing of steps K121 and K131 as noted above is repeated, with corresponding processing being repeated with regard to steps S130 and S140 as well.

If at step K160, however, the new block number had reached M+1, the controller 29 of the base station 2 ends the above-noted processing.

Besides, at step S170, the controller 11 of the navigation apparatus 1 respectively stores the received blocks IRm of the route information IR and the received blocks IRAm of the added route information IRA into the RAM. While the current position P that is measured by the current position measuring section 3 is also superimposed, each block IRm of the route information IR and each block IRAm of the added route information IRA are sequentially displayed. At last, the route information IR, added route information IRA and current position P are displayed on the display 7, thereby ending the current processing.

Thereafter, the operator of the vehicle, for example, the passenger can use the displayed route map and such features as intersections, buildings, or side roads that are displayed on the display 7, this being not only the route information IR but also the added route information IRA, as a guide in verifying the actual road conditions, so as to drive or guide the vehicle along the displayed path, thereby enabling the reliable attainment of the desired target destination.

More specifically, in this embodiment of the present invention, in the case in which the route information IR or added route information IRA being sent from the base station 2 is cutoff, the controller 11 of the navigation apparatus 1, in order to request a retransmitting of blocks after the cutoff block number, transmits a resend request signal from the vehicle-mounted communication section 5 to the base station 2.

In response to the above-noted request signal, when the controller 29 of the base station 2 receives the resend request signal from the navigation apparatus 1 via the base station communication section 19, it retransmits the route information IR or added route information IRA as the blocks after the communication cutoff, via the base station communication section 19.

Therefore, in the vehicle navigation system according to this embodiment, there is effective reduction of the amount of information that needs to be resent, and its result is the achievement of effective use of the communication circuit and efficient communication thereover.

Additionally, even if communication is cutoff, each of the already-sent blocks can be stored in the navigation apparatus 1, and the blocks of the route information IR and added route information IRA up until the interruption of communication can be displayed. Thus, the yet-unsent blocks can be sent after the communication is restored to a stable condition, thereby enabling reliable and effective transmitting and receiving of information.

As described above, in accordance with the above-noted embodiment of the present invention, by dividing the route information IR and the added route information IRA each up into M blocks, which are sequentially sent, even in a case in which communication is interrupted midway, it is not necessary to resend the route information and the added route information from the beginning.

Therefore, by starting the retransmitting of information blocks from the point at which the information was cutoff, the amount of information requiring retransmitting is reduced, thereby enabling efficient use of the communication circuit and achieving highly efficient communication.

Although in the above-noted embodiment, both the route information IR and the added route information IRA are divided into M blocks, it will be understood that, as necessary, it is alternately possible to divide only one of these into blocks.

Additionally, although in the above-noted embodiment, each block IRm of the route information IR and each block IRAm of the added route information IRA are sequentially displayed on the display 7, it will be understood that it is alternately possible to display all of the route information IR and all of the added route information IRA on the display 7 after all blocks thereof have been received.

Finally, the third embodiment of a vehicle navigation system according to the present invention is described below, with reference to relevant accompanying drawings.

In this embodiment as well, constituent elements that are same as in the first embodiment are assigned the same reference numerals and will only be described briefly herein, and steps which operate in the same manner as steps of the first embodiment will be only briefly described.

Figure 7:
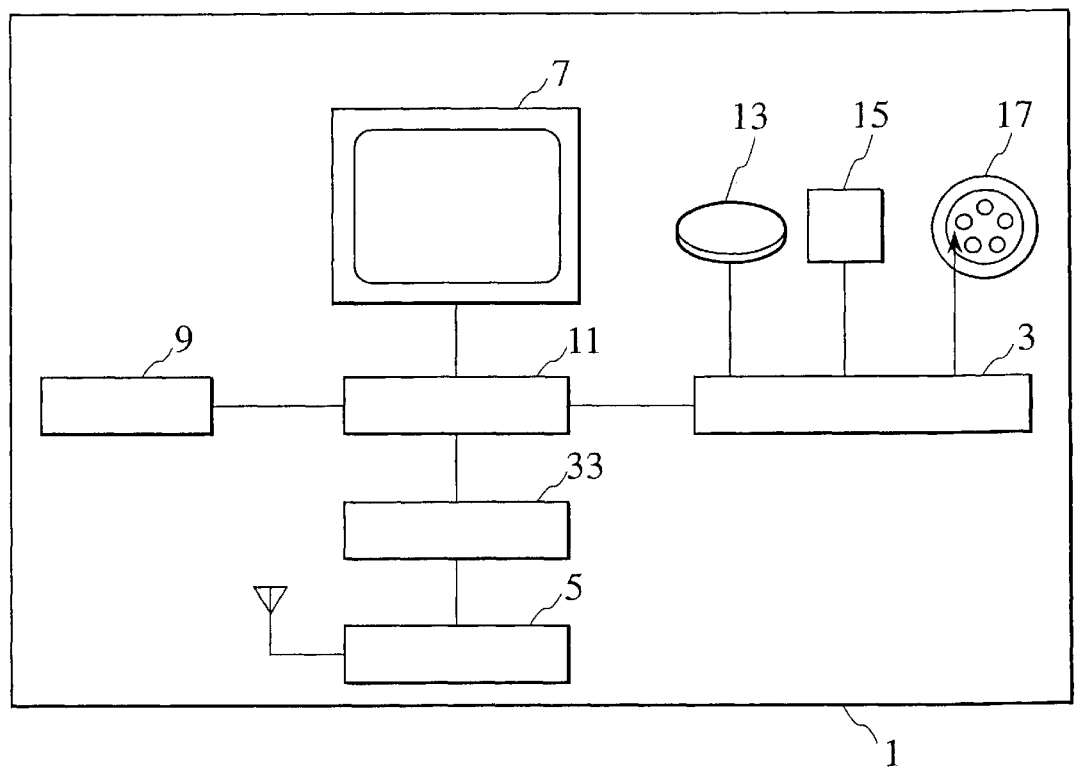
FIG. 7 is a block diagram of the navigation apparatus of a vehicle navigation system of the third embodiment according to the present invention.

Referring to FIG. 7, the configuration of a navigation apparatus 1 of the third embodiment of the present invention is as follows.

A feature of the navigation apparatus 1 of this embodiment as illustrated in FIG. 7 is the additional provision of a received block storage section 33 between the controller 11 and the vehicle-mounted communication section 5.

The received block storage section 33 stores block names appended to the route information IR and added route information IRA received by the vehicle-mounted communication section 5.

The controller 11 controls such system elements as the current position measuring section 3, the vehicle-mounted communication section 5, the display 7, the input section 9, and the received block storage section 33.

Figure 8:
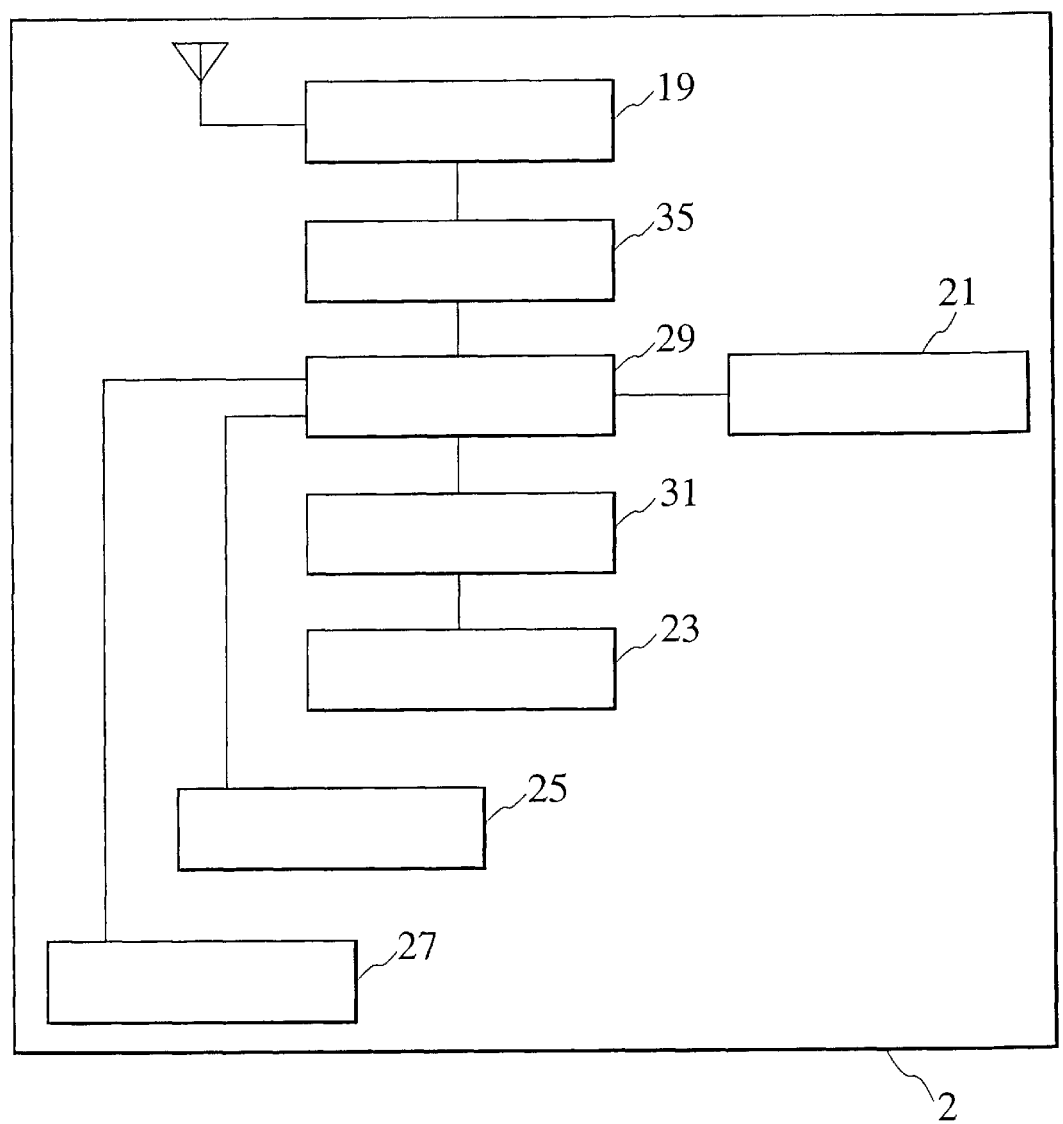
FIG. 8 is a block diagram of the base station of the vehicle navigation system of the third embodiment.

Referring to FIG. 8, the configuration of the base station 2 of the third embodiment is as follows.

A feature of the base station 2 shown in FIG. 8 is the additionally provision of a transmitted block storage section 35 between the controller 29 and the base station communication section 19.

The transmitted block storage section 35 stores the block names appended to the route information IR and added route information IRA transmitted from the base station communication section 19.

The controller 29 controls such system elements as the base station communication section 19, the road map data storage section 21, the route searching section 23, the route division calculation section 31, the route information storage section 25, the added route information storage section 27, and the transmitted block storage section 35.

Figure 9A:
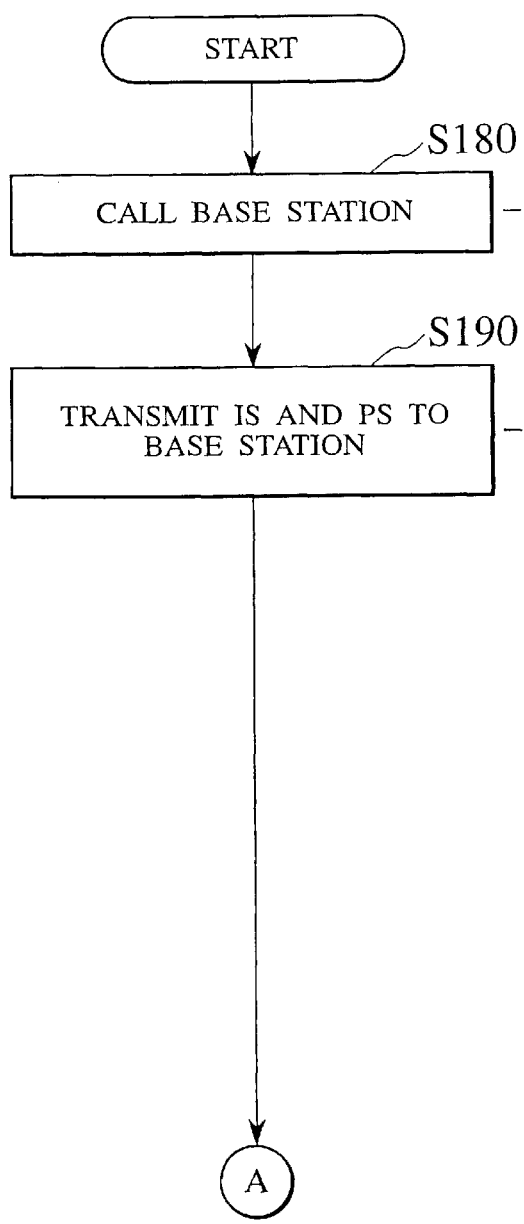
FIG. 9A is a flowchart of the navigation apparatus of the vehicle navigation system of the third embodiment.
Figure 9B:
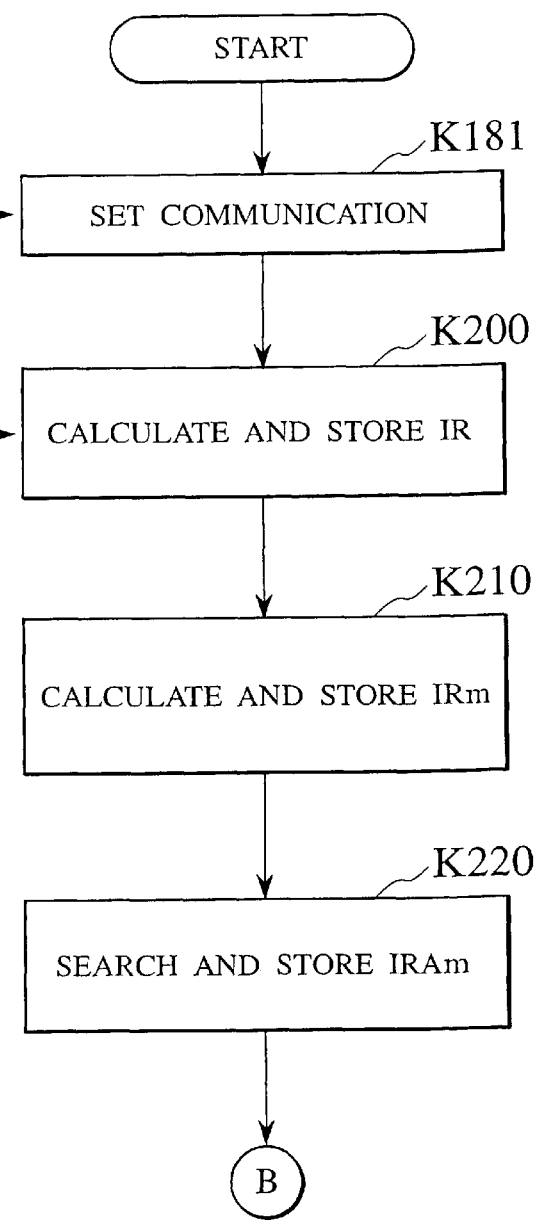
FIG. 9B is a flowchart of the base station of the vehicle navigation system of the third embodiment.
Figure 10A:
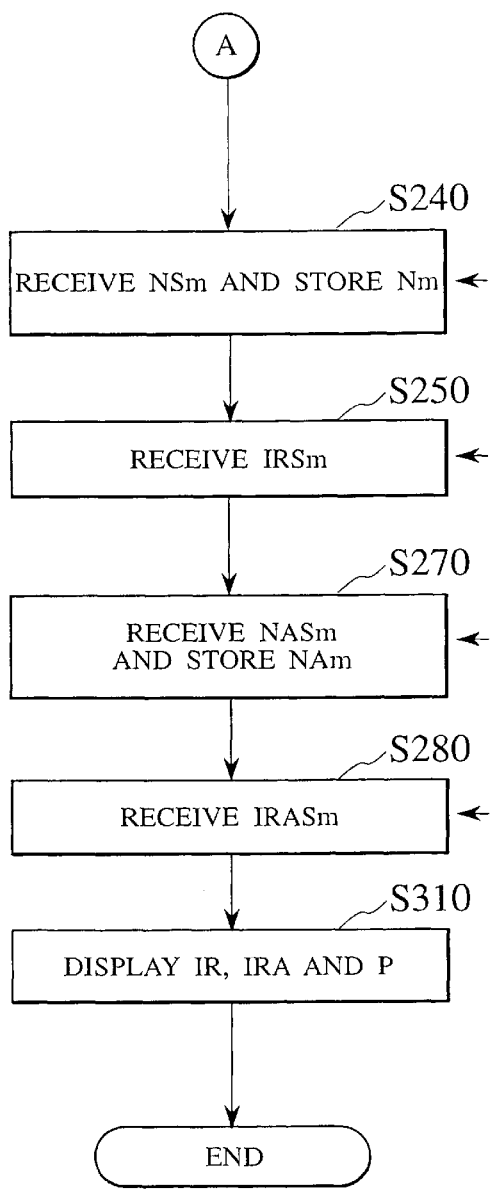
FIG. 10A is a flowchart that is a continuation of the flowchart of FIG. 9A with regard to the navigation apparatus of the vehicle navigation system of the third embodiment.
Figure 10B:
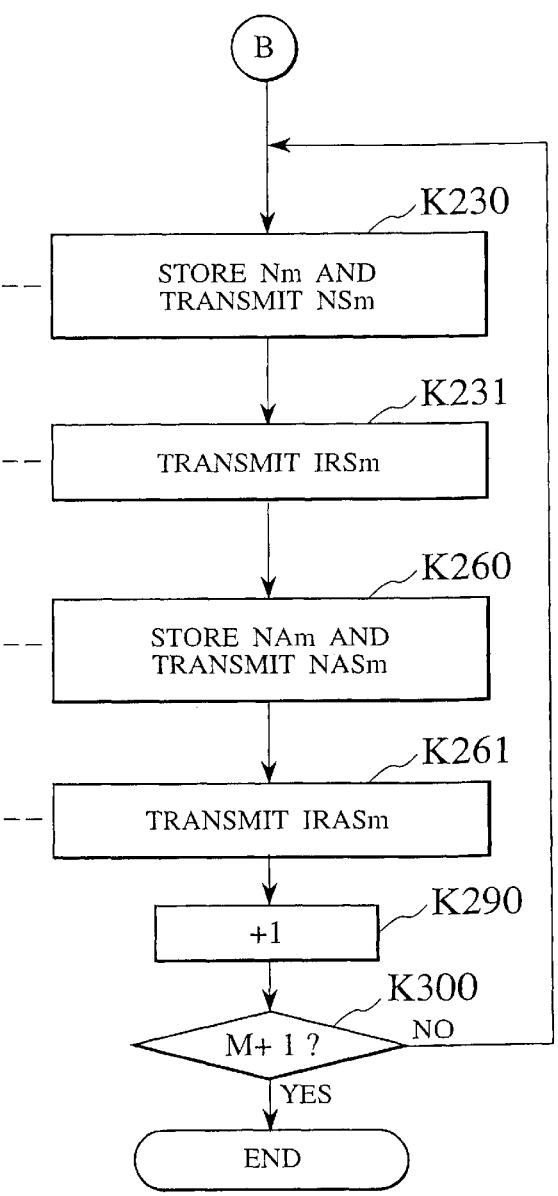
FIG. 10B is a flowchart that is a continuation of the flowchart of FIG. 9B with regard to the base station of the vehicle navigation system of the third embodiment.

Next, the operation of the third embodiment will be described, with reference to the flowcharts of FIG. 9A through FIG. 10B. FIG. 9A and FIG. 10A show the processing of the navigation apparatus 1 of this embodiment, while FIG. 9B and FIG. 10B show the processing of the base station 2 of this embodiment.

First, at step S180, the vehicle-mounted communication section 5 of the navigation apparatus 1 calls the base station communication section 19 of the base station 2.

In response to this call, at step K181, the base station 2 receives the call from the navigation apparatus 1 via its base station communication section 19, establishes a communication circuit, and sets communication.

Next, at step S190 an operator, for example, a passenger inputs the target destination T, the route searching conditions C, and the added route information conditions CA, via the input section 9 of the navigation apparatus 1, and an information signal IS that includes this information is sent to the base station 2 via the vehicle-mounted communication section 5. Simultaneously with this, a position signal PS of the current position P that is measured by the current position measuring section 3 is sent to the base station 2.

In response to the above, at step K200, based on the information signal IS and position signal PS received via the base station communication section 19 of the base station 2, the target destination T, the route searching conditions C, the added route information conditions CA, and the current position P are sent to the route searching section 23.

At this point, the route searching section 23, based on the vehicle current position P, the target destination T, the route searching conditions C, and the added route information conditions CA, calculates the route information IR for a path from the current position P to the target destination T, and stores the result of the calculation in the route information storage section 25.

Next, at step K210, the route division calculation section 31 divides the route information IR obtained at step K200 into M parts. Each route information IRm corresponding to each block of the M-divided route information IR is stored in the route information storage section 25, in the sequence m=1, 2, 3 . . . M, starting from the current position.

Next, at step K220, the controller 29 searches each added route information IRAm corresponding to each block IRm of the route information IR stored in the route information storage section 25 from the road map data storage section 21, and the results of that search are stored in the added route information storage section 27 as blocks IRAm of the added route information IRA corresponding to the individual blocks IRm of route information IR.

Processing now proceeds to the processing shown in FIG. 10A and FIG. 10B.

At step K230, the transmitted block storage section 35 stores the block name N1 of the first block IR1 of route information IR that is transmitted. Simultaneously with this, the controller 29 transmits the block name N1 of the first block IRI of route information IR to the base station communication section 19, and its block name signal NS1 of the first block IRI of route information IR is transmitted from the base station communication section 19 to the navigation apparatus 1 which called.

In response to the above, at step S240, the vehicle-mounted communication section 5 of the navigation apparatus 1 receives the block name signal NS1 of the first route information block IR1 and stores the block name N1 of the first block IR1 of route information IR into the received block storage section 33.

Next, at step K231 the base station communication section 19 of the base station 2 transmits the first block IR1 of route information IR as the route information signal IRS1 to the navigation apparatus 1 which called.

In response to the above, at step S250, the vehicle-mounted communication section 5 of the navigation apparatus 1 receives the route information signal IRS1 of the first block IR1 from the base station 2.

Next, a step K260, the transmitted block storage section 35 of the base station 2 stores the block name NA1 of the first added route information IRA1 that is transmitted. Simultaneously with this, the controller 29 transmits the name first block NA1 of added route information IRA1 to the base station communication section 19, and its block name signal NAS1 for the first block IRA1 of added route information IRA is transmitted to the navigation apparatus 1 which called.

In response to the above, at step S270, the vehicle-mounted communication section 5 of the navigation apparatus 1 receives the block name signal NAS1 of the first block IRA1 of added route information IRA, and the received block storage section 33 stores the received block name NA1 of the first added route information IRA1.

Next, at step K261, the base station communication section 19 of the base station 2 transmits the first block IRA1 of added route information IRA to the navigation apparatus 1 that called, as the added route information signal IRAS1.

In response to the above, at step S280, the vehicle-mounted communication section 5 of the navigation apparatus 1 receives the first block added route information signal IRAS1 from the base station 2.

Next, at step K290, the controller 29 of the base station 2 increments the current block number by 1 so as to generate a new block number.

Next at step K300, if the new block number is less than M+1, return is made to step K230.

If return is made to step K230 as noted above, the processing of steps K230, K231, K260 and K261 are repeated, with corresponding processing being repeated with regard to steps S240, S250, S270, and S280 as well.

If at step K300, however, the new block number had reached M+1, the controller 29 of the base station 2 ends the above-noted processing.

Besides, at step S310, the controller 11 of the navigation apparatus 1 respectively stores the received blocks IRm of the route information IR and the received blocks IRAn of the added route information IRA into the RAM. While the current position P that is measured by the current position measuring section 3 is also superimposed, each block IRm of the route information IR and each block IRAm of the added route information IRA are sequentially displayed. At last, the route information IR, added route information IRA and current position P are displayed on the display 7, thereby ending the current processing.

Thereafter, the operator of the vehicle, for example, the passenger can use the displayed route map and such features as intersections, buildings, or side roads that are displayed on the display 7, this being not only the route information IR but also the added route information IRA, as a guide in verifying the actual road conditions, so as to drive or guide the vehicle along the displayed path, thereby enabling the reliable attainment of the desired target destination.

More specifically, the navigation apparatus 1 according to the third embodiment of the present invention, stores the block names Nm of the received route information IR and the block names NAm of the received added route information IRA, in addition to the base station 2 respectively storing the names Nm and NAm of the transmitted blocks.

Even if the transmission of information is interrupted midway, because the block names Nm of the interrupted route information IR and the block names NAm of the interrupted added route information IRA are stored, it is not necessary to resend the route information IR and the added route information IRA from the beginning. That is, after the communication becomes stable, it is sufficient to respectively resend information only starting at the route information IRm and at the added route information IRAm when the interrupted blocks have the names Nm and NAm.

In this embodiment of the present invention as well, therefore, there is effective reduction of the amount of retransmitted information, thereby enabling efficient use of the communication circuit.

As described above, in this embodiment as well, by dividing the route information and the added route information each up into M blocks, which are sequentially sent, even in a case in which communication is interrupted midway, it is not necessary to resend the route information and the added route information from the beginning.

Therefore, by starting the retransmitting of information blocks from the point at which the information was cutoff, the amount of information requiring retransmitting is reduced, thereby enabling efficient use of the communication circuit and achieving highly efficient communication.

Additionally in this embodiment in particular, because the names of blocks Nm and NAm are stored when the communication is cutoff, it is possible to reliably start the retransmission of route information IR and added route information IRA from these blocks IRm and IRAm.

Although in the above-noted embodiment, both the route information IR and the added route information IRA are divided into M blocks, it will be understood that, as necessary, it is alternately possible to divide only one of these into blocks.

Additionally, although the block names of both the route information IR and the added route information IRA are stored in the third embodiment as described above, it will be understood that it is alternately possible to store the names of blocks of just one of these, as necessary.

Additionally, although in the above-noted embodiment, the blocks IRm of the route information IR and the blocks IRAm of the added route information IRA are sequentially displayed on the display 7, it will be understood that it is alternately possible to display all of the route information IR and all of the added route information IRA on the display 7 after all blocks thereof have been received.

As described in detail above, according to a vehicle navigation system of the present invention, by transmitting added route information in addition to the route information, it is possible to achieve a match between the road that is actually traveled and the display screen, thereby enabling effective prevention of inadvertent entry into a different road from the selected route.

Additionally, because added route information is transmitted after transmission of route information from the base station, even if communication of information is interrupted, it is possible to make effective use of the communication circuit, without the need to send the information from the beginning.

The entire contents of a Patent Application No. TOKUGANHEI 11-8334, with a filing date of Jan. 14, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A vehicle navigation system comprising:
   a navigation apparatus for transmitting a current position of a vehicle and a target destination thereof;
   a base station for receiving the current position and the target destination, searching map information to obtain route information from the current position to the target destination, and transmitting the route information to the navigation apparatus;
   an information storage section provided in the base station which stores the map information;
   a route searching section provided in the base station which searches the map information to obtain added route information, which includes identification information relating to the ability of a vehicle operator to correlate the route information with an intended route;
   a transmitting section provided in the base station and transmitting the route information to the navigation apparatus and then transmitting the added information thereto; and
   a display section provided in the navigation apparatus and displaying the route information and the added route information each of which is transmitted from the base station, such that a relationship between the route information and a route along which the vehicle is intended to travel is identified.

2. A vehicle navigation system according to claim 1, wherein the base station further comprises an information dividing section dividing the route information into a plurality of blocks, and the plurality of blocks of the route information are sequentially transmitted to the navigation apparatus.

3. A vehicle navigation system according to claim 2, wherein the display section of the navigation apparatus sequentially displays the plurality of blocks of the route information transmitted from the base station.

4. A vehicle navigation system according to claim 2, wherein the base station further comprises a storage section identifying each of the plurality of blocks of the route information and storing the plurality of blocks of the route information.

5. A vehicle navigation system according to claim 4, wherein the navigation apparatus further comprises a storage section identifying each of the plurality of blocks of the route information received from the base station and storing the plurality of blocks of the route information.

6. A vehicle navigation system according to claim 2, wherein when the plurality of blocks of the route information transmitted from the base station are interrupted, the navigation apparatus requests retransmission starting from a block that is interrupted and the base station, in response to a request for the retransmission from the navigation apparatus, retransmits the plurality of blocks of the route information started at the block that is interrupted.

7. A vehicle navigation system according to claim 1, wherein the base station further comprises an information dividing section dividing the added route information into a plurality of blocks, and the plurality of blocks of the added route information are sequentially transmitted to the navigation apparatus.

8. A vehicle navigation system according to claim 7, wherein the display section of the navigation apparatus sequentially displays the plurality of blocks of the added route information transmitted from the base station.

9. A vehicle navigation system according to claim 7, wherein the base station further comprises a storage section identifying each of the plurality of blocks of the added route information and storing the plurality of blocks of the added route information.

10. A vehicle navigation system according to claim 9, wherein the navigation apparatus further comprises a storage section identifying each of the plurality of blocks of the added route information received from the base station and storing the plurality of blocks of the added route information.

11. A vehicle navigation system according to claim 7, wherein when the plurality of blocks of the added route information transmitted from the base station are interrupted, the navigation apparatus requests retransmission starting from a block that is interrupted, and the base station, in response to a request for the retransmission from the navigation apparatus, retransmits the plurality of blocks of the added route information started at the block that is interrupted.

12. A vehicle navigation system according to claim 1, wherein the map information includes an intersection node and a road link.

13. A vehicle navigation system according to claim 1, wherein the added route information includes a side road, a landmark or intersection name.

14. A vehicle navigation system according to claim 1, wherein the display section displays the current position of the vehicle in a superimposed manner.

15. A vehicle navigation system comprising:
    a navigation apparatus transmitting a current position of a vehicle and a target destination thereof:
    a base station receiving the current position and the target destination, searching map information to determine route information from the current position to the target destination, and transmitting the route information to the navigation apparatus:
    means, provided in the base station, for storing added information with regard to road features;
    means, provided in the base station, for searching the added information to obtain added route information, which includes identification information relating to the ability of a vehicle operator to correlate the route information with an intended route;
    means, provided in the base station, for transmitting the route information to the navigation apparatus, and for then transmitting the added route information thereto; and
    means, provided in the navigation apparatus, for displaying the route information and the added route information each of which is transmitted from the base station.

16. A method for navigating a vehicle comprising:
    transmitting a current position of a vehicle and a target destination thereof from a navigation apparatus to a base station;
    receiving at the base station the current position and the target destination;
    searching map information to obtain route information with regard to a route from the current position to the target destination;
    transmitting the route information to the navigation apparatus;

searching the map information to obtain added route information with regard to the route, said added route information including identification information relating to the ability of a vehicle operator to correlate the route information with an intended route;

transmitting the added route information to the navigation apparatus after the route information is transmitted to the navigation apparatus; and displaying at the navigation apparatus the route information and added route information each of which is transmitted from the base station.

17. A method for navigating a vehicle according to claim 16, wherein the route information is divided into a plurality of blocks, and the plurality of blocks of the route information are sequentially transmitted to the navigation apparatus.

18. A method for navigating a vehicle according to claim 16, wherein the added route information is divided into a plurality of blocks, and the plurality of blocks of the added route information are sequentially transmitted to the navigation apparatus.

* * * * *